Oct. 23, 1962     H. VOLKS ETAL     3,059,391
ASSEMBLING INSERTS, LETTERS, ETC., INTO
ENVELOPE DURING FORMATION
Filed July 29, 1960     11 Sheets-Sheet 1
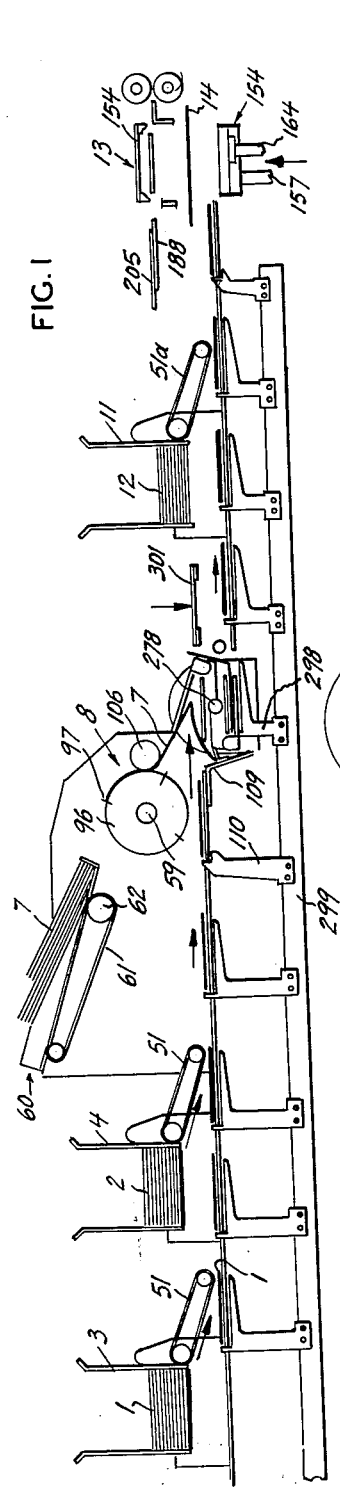
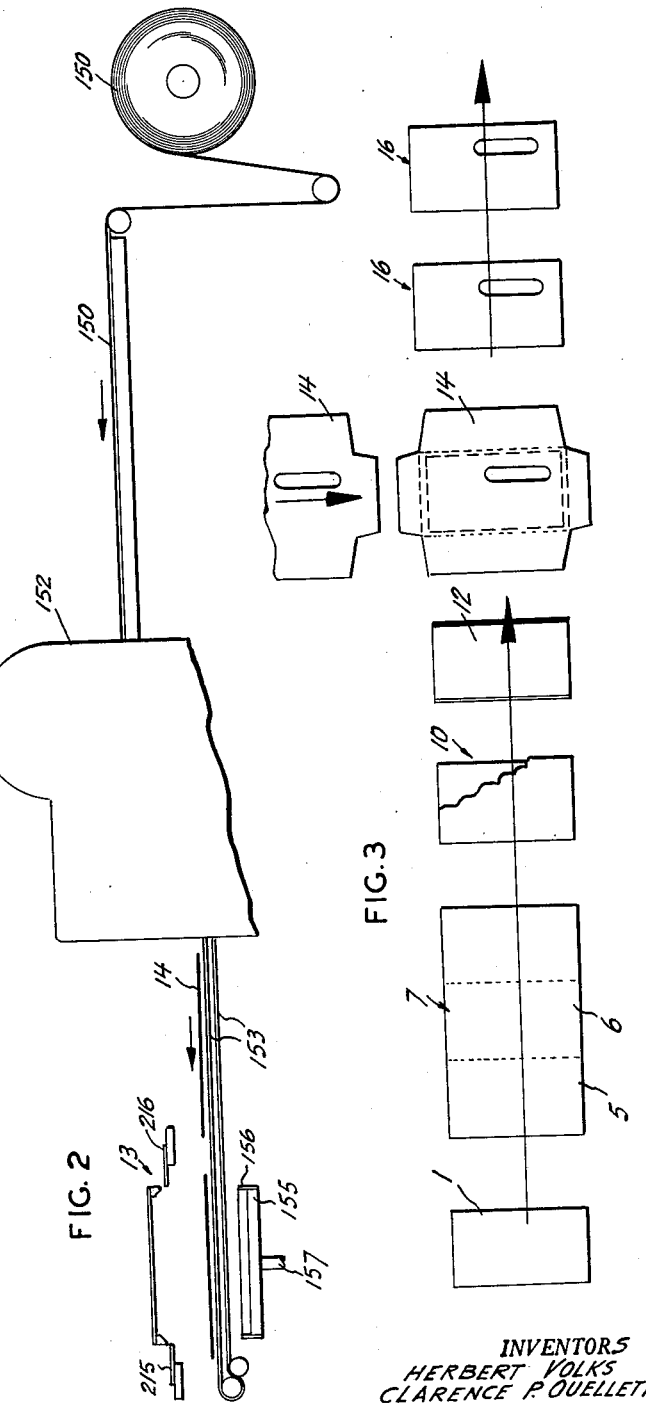
INVENTORS
HERBERT VOLKS
CLARENCE P. OUELLETTE
BY
Bierman & Bierman
ATTORNEYS

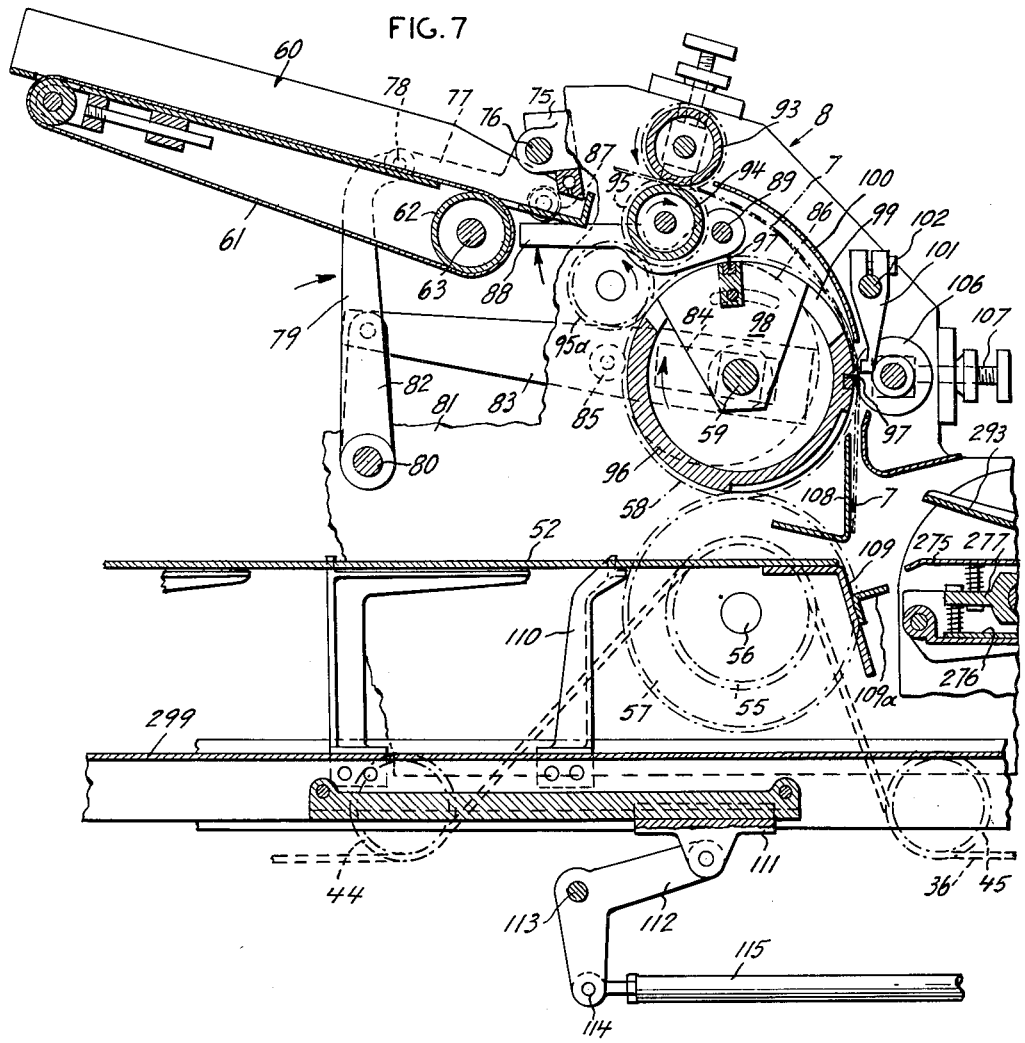
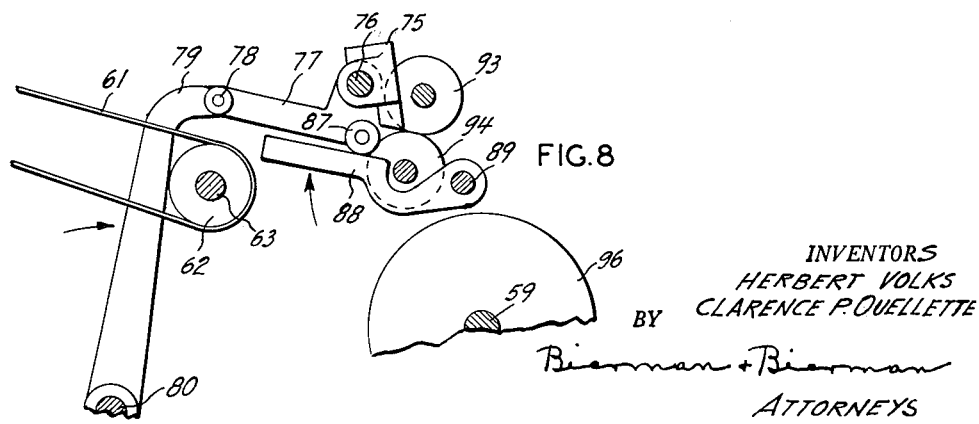

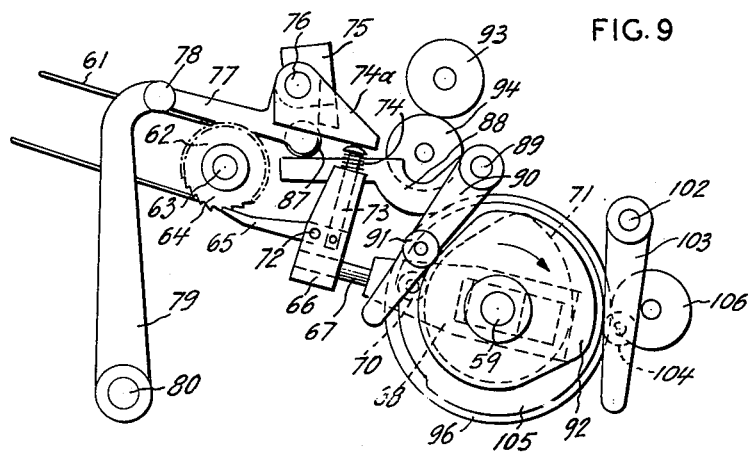
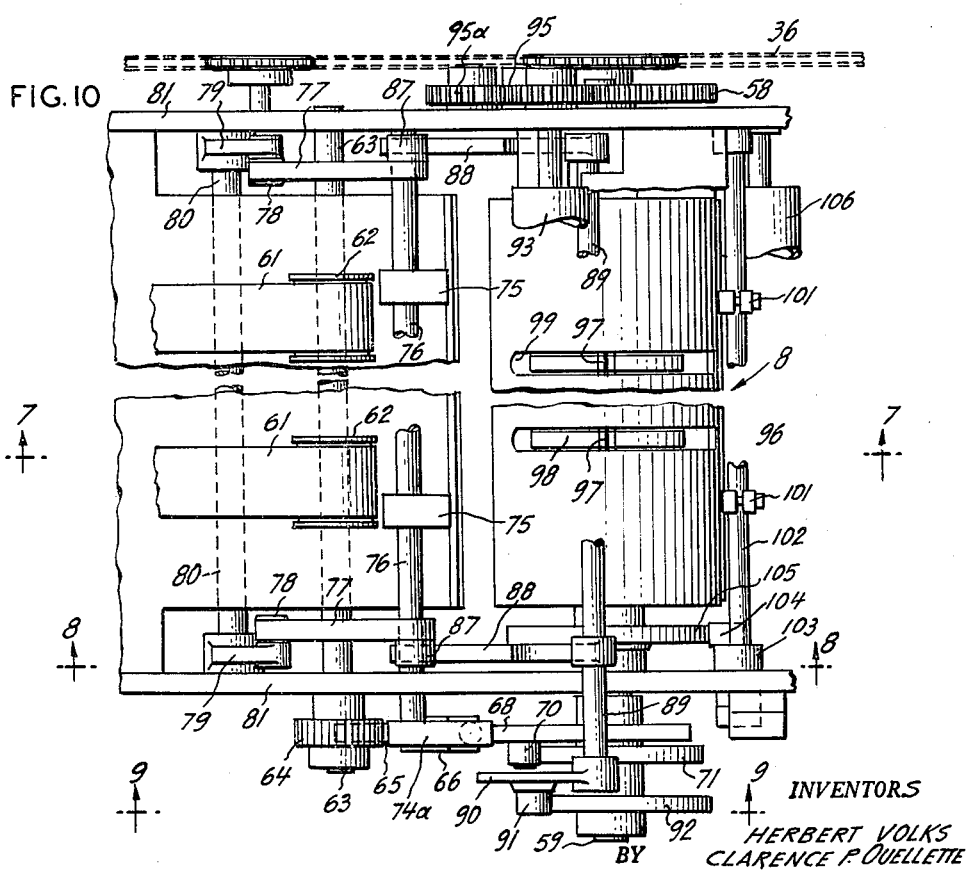

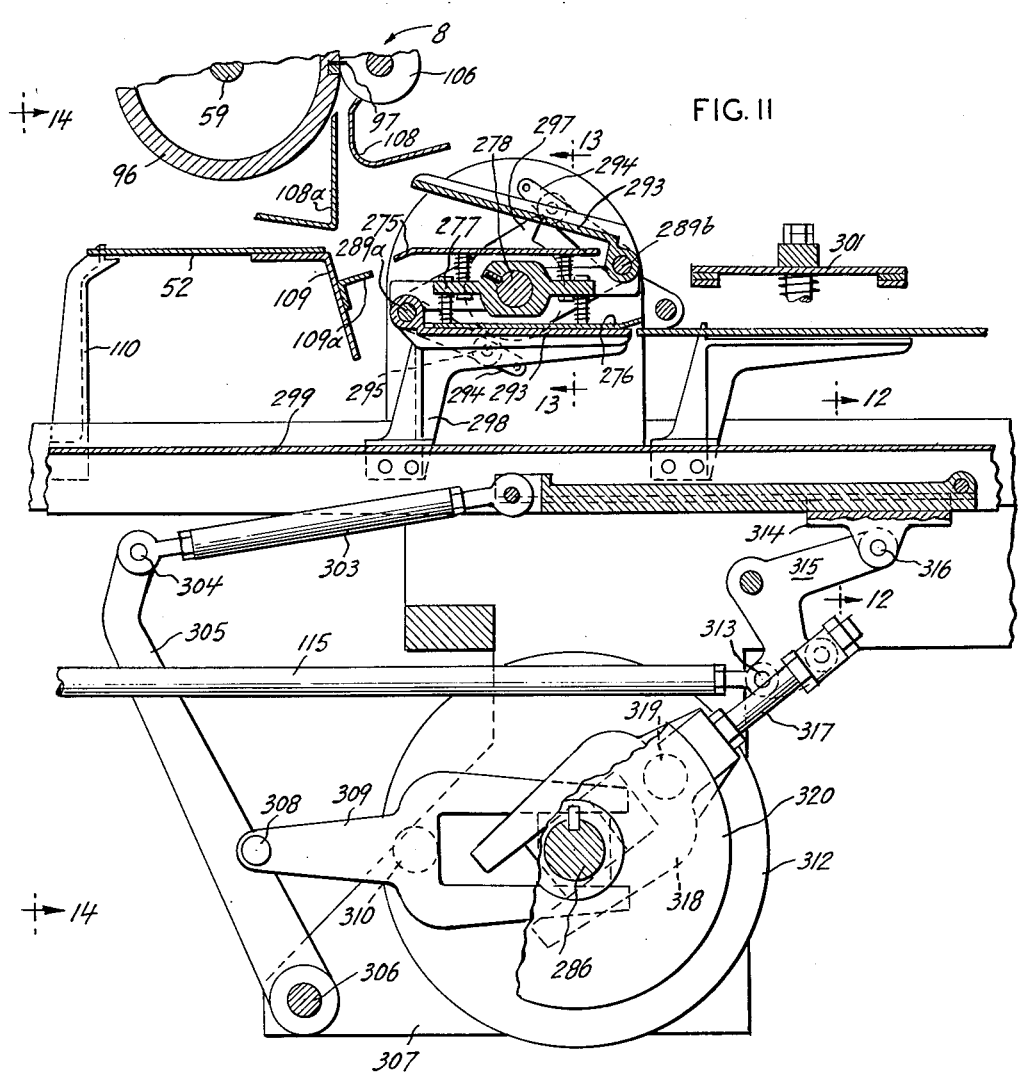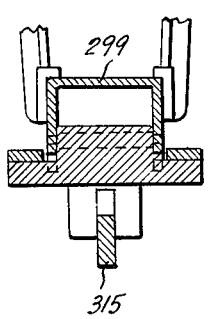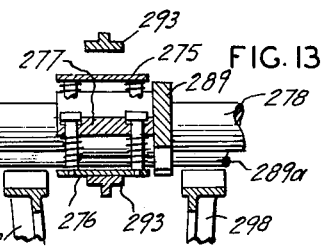

INVENTORS
HERBERT VOLKS
CLARENCE P. OUELLETTE
BY
Bierman & Bierman
ATTORNEYS

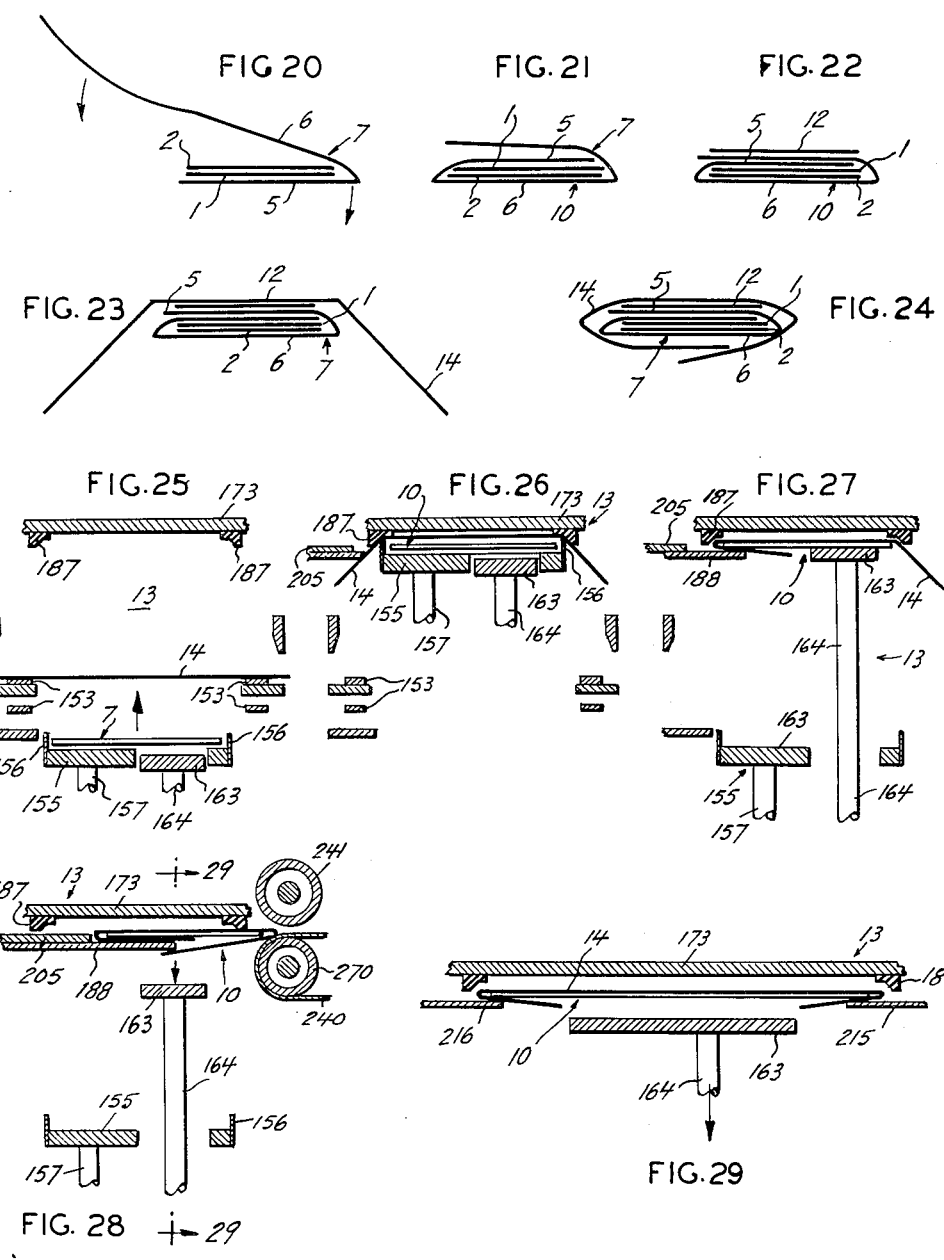

United States Patent Office 3,059,391
Patented Oct. 23, 1962

3,059,391
ASSEMBLING INSERTS, LETTERS, ETC., INTO
ENVELOPE DURING FORMATION
Herbert Volks, New York, N.Y., and Clarence P. Ouellette, Springfield, Mass., assignors to En Mail Machine Corporation, New York, N.Y., a corporation of Delaware
Filed July 29, 1960, Ser. No. 46,209
5 Claims. (Cl. 53—206)

This invention relates to a method and apparatus for enclosing a letter, and if desired, one or more inserts or enclosures within an envelope, and it comprehends a method and apparatus by which the inserts are removed from one or more magazines; are placed upon a sheet, such as a letter; and an envelope is formed from strip material and is delivered to a position where the letter, which has been folded around the inserts, is disposed against the envelope, which then has its flaps folded and sealed down to enclose the letter and the inserts.

It is an object of the invention to provide an apparatus which operates as above described, and by which the preparation of mailing material is greatly facilitated.

It is an object of the invention to provide a machine of this character by means of which the contents of an envelope will be assembled, folded, presented to an envelope blank and the flaps of the envelope blank folded down and sealed.

More particularly, the invention contemplates the provision of an apparatus in which enclosures or inserts are collected; the same are placed between portions of a partly-folded letter sheet; the letter sheet is then completely folded around the inserts; the folded letter sheet and its contents are then presented against the inner surface of an envelope blank and the flaps of the envelope blanks are then folded down and sealed to thus enclose the letter and its contents. If the envelope used is of the window type, a sheet or card bearing the name and address of an addressee will be deposited on top of the folded letter sheet prior to the presentation of the same against the envelope blank so that the name and address on the card will become visible through the window opening in the envelope.

With these and other objects to be hereinafter set forth in view, we have devised the arrangement of parts to be described and more particularly pointed out in the claims appended hereto.

In the accompanying drawings, wherein an illustrative embodiment of the invention is disclosed, FIG. 1 is a diagrammatic view of an apparatus constructed according to the invention;

FIG. 2 is a diagrammatic view of the envelope producing and feeding means;

FIG. 3 is a diagrammatic view illustrating the steps pursued in preparing the inserts or enclosures, letter sheet and envelope and producing the envelope-enclosed mailing piece;

FIG. 7 is a sectional view through the mechanism for feeding and creasing the letter sheet, the view being taken substantially on the line 7—7 of FIG. 10, looking in the direction of the arrows;

FIG. 8 is a view showing the suction picker mechanism for handling the letter sheets, the view being taken substantially on the line 8—8 of FIG. 10, looking in the direction of the arrows;

FIG. 9 is a view taken substantially on the line 9—9 of FIG. 10, looking in the direction of the arrows;

FIG. 10 is a plan view of the letter sheet feeding and creasing apparatus, with some of the parts fragmentarily shown in order to disclose construction;

FIG. 11 is a sectional view constituting an extension of the right end of FIG. 7;

FIG. 12 is a sectional view, taken substantially on the line 12—12 of FIG. 11, looking in the direction of the arrows;

FIG. 13 is a sectional view, taken substantially on the line 13—13 of FIG. 11, looking in the direction of the arrows;

Figure 4:
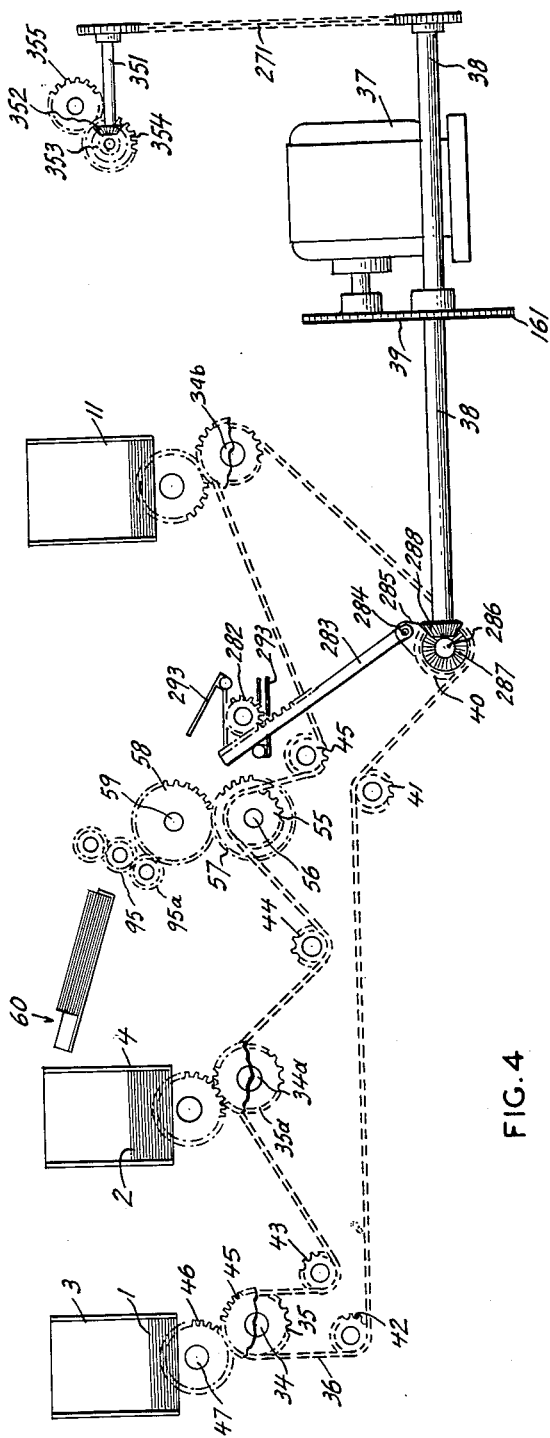
FIG. 4 is a view showing the driving mechanism for the various units of the apparatus.

FIGS. 20 to 24 inclusive are diagrammatic views showing respectively, the delivery of the inserts or enciosures to the letter sheet; the folding of the letter sheet around the inserts; the placement of the address card or sheet onto the folded letter sheet; the positioning of the letter sheet, inserts and address card against an envelope blank, and the folding of the flaps of the envelope blank to cause the produced envelope to enclose the letter sheet, the inserts and the address card;

FIGS. 25 to 28 inclusive are diagrammatic views showing the steps involved in delivering the material for enclosure to the envelope blank and folding the flaps of the envelope blank around such material, and FIG. 29 is a sectional view, taken substantially on the line 29—29 of FIG. 28, looking in the direction of the arrows.

By reference to FIGS. 1, 2, 3 and 20 to 24 inclusive, the steps performed by the apparatus of the present invention will be seen. The apparatus feeds one or more inserts or enclosures to a position between folded parts of a sheet, such as a letter sheet, and the completion of the folding of the letter sheet around the inserts to encircle them is then performed. In the event that an envelope of the window type is employed, an address card or sheet is placed on top of the folded letter sheet and the folded letter sheet, bearing the address card, is then transported to a station where it is presented against an envelope blank which has its several flaps infolded and then sealed to thereby enclose its contents, consisting of the letter sheet, the inserts enclosed therein, and the address card, as aforesaid. Means are provided for producing and supplying the envelopes to the envelope-filling and folding station.

In FIG. 3, one of the inserts is shown at 1, the same consisting of a sheet or card, and in FIG. 20, two inserts, indicated respectively at 1 and 2, are shown in superposed relation, the insert shown at 1 being that taken from the magazine 3 in FIG. 1, while the insert shown at 2 is taken from the magazine shown at 4. Inserts taken from these magazines are transported, by means to be described, to the station where they are entered between the folds 5 and 6 (FIG. 20) of a letter sheet 7 preparatory to being enclosed by the letter sheet. This station is generally indicated at 8 in FIG. 1. At said station, the completion of the operation of folding the letter sheet around the inserts 1 and 2 takes place, so that when the letter sheet and its contained contents leaves the aforementioned station, it is in the form shown in FIG. 21.

The resultant packet, shown at 10 in FIGS. 3 and 21, consists of the folded letter sheet and enclosed inserts, and it now proceeds to an address-card delivery station 11 (FIG. 1) whereat a card 12 bearing the name and address of the addressee is deposited on top of the folded letter sheet. The card 12, and the packet 10 are now carried to the enveloping station 13, where an envelope blank 14, delivered from the envelope blank producing apparatus, diagrammatically shown in FIG. 2, is positioned above the letter sheet and its associated inserts and the address card. These elements are elevated and are brought into contact with the envelope blank, which then has its flaps folded around its contents to enclose them, the envelope-enclosed material then proceeding from the apparatus as indicated at 16 in FIGS. 3 and 24. In the drawings, the means for supplying two enclosures or inserts for each envelope is shown, but it will be understood that this number can be increased or decreased as required. One of the units for supplying the inserts is shown in detail in FIGS. 5 and 6, wherein it will be noted that the inserts, in the form of cards or sheets, are stacked in a magazine and supported and aligned by side plates 20, 21 and 22, some of these plates being adjustable relatively to the others, by means of the adjusting screws 23, to compensate for differently-sized inserts. A set screw 24 serves to maintain the guide plates in the selected positions of adjustment.

At 25 is shown a suction picker, provided with the suction cups 26. The picker 25 is provided at its opposite ends with the curved arms 27, secured on rocking shafts 28, mounted for oscillating movement in the side frames 29 of the unit. Shaft 28 is rocked by means of an arm 30 secured to it and to which is adjustably attached one end of a rod 31, having its opposite end provided with an eccentric yoke 32 engaged by an eccentric 33 on shaft 34. Shaft 34 carries a sprocket 35 which is driven by a chain 36 operative in the manner shown in FIG. 4.

It will be seen in FIG. 4 that the chain 36 is primarily driven from an electric motor 37 driving a shaft 38 by means of chain 39. Shaft 38 drives shaft 286 through miter gears 287 and 288. Shaft 286 carries a sprocket 40 engaging the chain 36, which chain also engages several idlers, indicated respectively at 42, 43, 44, and 45a, as well as several other sprockets to be later referred to.

Mounted on the shaft 34 is a gear 45 which meshes with a gear 46 on a shaft 47 rotative in the frames 29 of the unit. Said shaft 47 carries a friction roller 48 (FIG. 5) provided with an insert 49 arranged to frictionally contact an insert drawn from the magazine by the suction picker and force the end of the same between a roller 50 and a belt 51 to be moved thereby toward the right in FIG. 5 by a travelling carrier 52 on which it is deposited. The roll shown at 53 aids in the delivery of the insert to the carrier.

Figure 5:
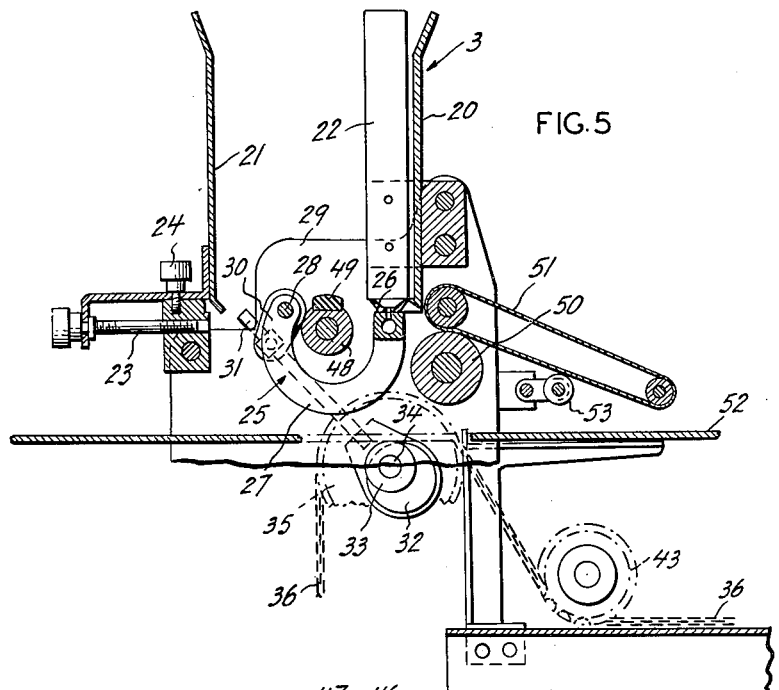
FIG. 5 is a sectional view of one of the magazines for the inserts or enclosures and the feed mechanism associated therewith, the view being taken substantially on the line 5—5 of FIG. 6, looking in the direction of the arrows.
Figure 6:
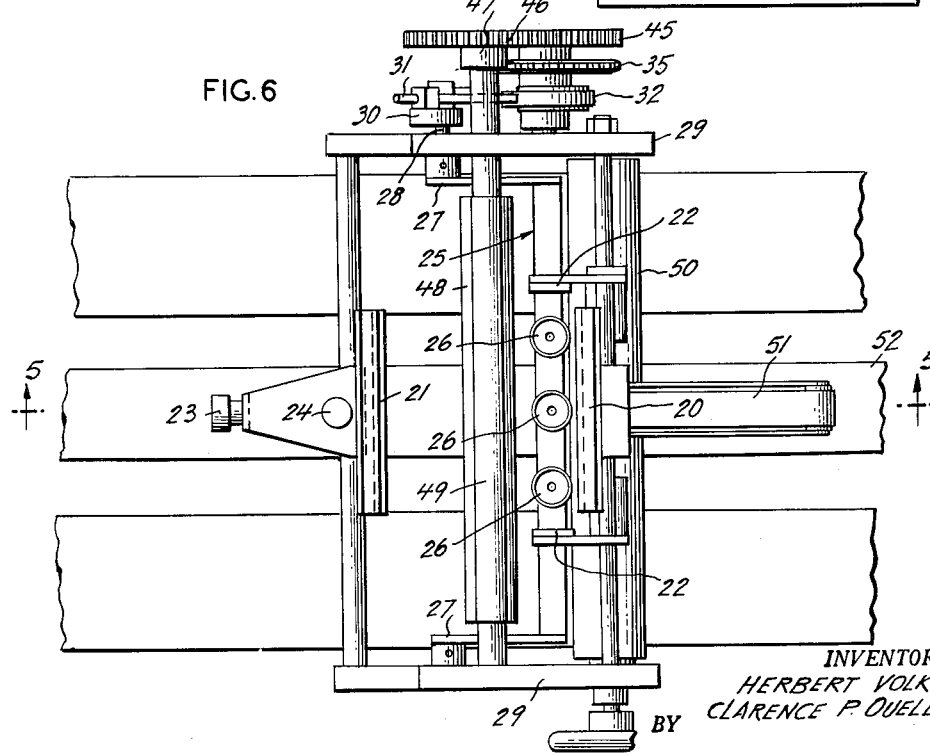
FIG. 6 is a top plan view of the structure disclosed in FIG. 5.
Figure 14:
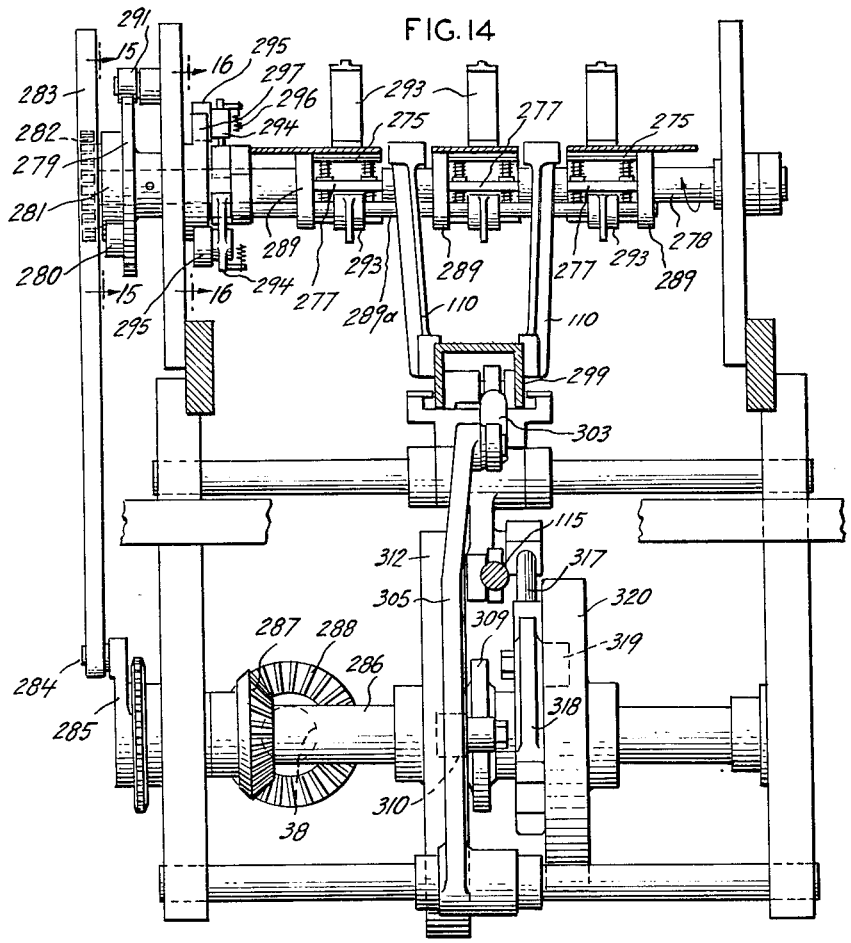
FIG. 14 is an end view of the apparatus shown in FIG. 11 as viewed from the line 14—14 of FIG. 11, looking in the direction of the arrows.

The mechanism shown in FIGS. 5 and 6 is such as to cause the inserts to be successively pulled down by the suction picker from the bottom of the stack in the magazine 3 and as each insert is pulled down and suctionally released, the friction roller 48 inserts it between the belt 51 and the roller 50 and by which it is delivered onto the carrier 52 and is moved thereby to the next station at which another insert is supplied.

Assuming that the insert-supplying station above described is that shown at 3 in FIG. 1, the insert 1 delivered therefrom and being borne by the carrier 52, will next be transported to a second insert-delivery station, or that indicated at 4. The construction of the apparatus at that station can be similar to that already described in respect to station 3, and at station 4 there is a shaft 34a and sprocket 35a driven by the chain 36 as clearly seen in FIG. 4. The remainder of the apparatus at station 4 is similar to that at station 3 and it operates to supply an insert 2 which is deposited on top of the insert 1 when the latter insert is moved by carrier 52 to a position below the station 4.

The two inserts, thus supplied respectively from stations 3 and 4, and in overlying relation, are transported by the carrier 52 to the letter sheet supply and folding station now to be described.

Chain 36 engages a sprocket 55 (FIG. 4) on a shaft 56, carrying a gear 57 meshing with a gear 58 on a shaft 59. The letter sheets 7 to be fed to the creasing and folding mechanism, are supported in a magazine or tray 60 provided at the bottom with a pair of intermittently-operated belt feeders 61. At one end, each of the belts 61 extends around a drum 62, both of the drums being mounted on the shaft 63. Secured on shaft 63 is a ratchet wheel 64, engaged by a pawl 65 (FIG. 9) which is adapted by its movement to rotatively move the ratchet wheel to cause travel of the belts 61. The pawl 65 is pivotally mounted in a block 66 secured to a rod 67 attached to a yoke 68 surrounding the shaft 59. Yoke 68 carries a cam roller 70 engaging cam 71 on shaft 59. This arrangement is such as to cause the pawl 65 to intermittently rotate the ratchet wheel 64 at required times and thus cause an intermittent feeding movement of the belt. The pawl 65 is pivoted at 72 in the block 66 and is connected at one end to a headed stem 73, biased by the coil spring 74. A finger 74a on shaft 76 permits engagement and disengagement of the pawl at the required times.

The picker mechanism for successively removing letter sheets from the magazine 60, includes suction heads 75 on the shaft 76. Mounted on the shaft 76 are arms 77 having their ends pivotally secured at 78 to the upper ends of levers 79, having their lower ends secured on a rocking shaft 80 rotative in suitable bearings in the side frames 81. Shaft 80 is oscillated by means of an arm 82 (FIG. 7) secured on the shaft 80 and pivotally connected at one end to a lever 83 having a yoke 84 embracing shaft 59. Lever 83 carries a cam roller 85 operative against cam 86 provided on the shaft 59. Through the construction described, the suction picket is moved back and forth or from its advanced and elevated position, shown in FIG. 8, to its retracted and lowered position shown in FIG. 9.

The arms 77 on the picker-supporting shaft 76 are provided at the bottom with rollers 87 adapted for contact with levers 88 pivotally secured at one end on a cross shaft 89. Said shaft is oscillated by cam means, including lever 90 secured on shaft 89 and carrying a cam roller 91 in contact with a cam 92 secured on the shaft 59. This arrangement is such that at the required times the suction picker will be raised and lowered in a manner to cause it to engage the uppermost letter sheet 7 in the magazine 60, lift it, and present it between the feed rolls designated at 93 and 94. Roll 94 is a driven roll, the shaft of the same carrying a gear 95, meshing with gear 95a that is in mesh with the gear 58.

Mounted on the shaft 59 is the creasing drum 96, provided with spaced creasing ribs 97 projecting from its periphery for producing spaced and parallel creases across the letter sheet. The spacing thus produced between the creases is regulatable by adjustment of the ribs 97 relatively to one another. Such adjustment is secured by providing one of the ribs in a segment 98 adjustable on the shaft 59, the body of the drum being apertured, as shown at 99, to permit of adjustment of the segment as above mentioned.

As the letter sheet 7 passes from between the feed rolls 93 and 94, it is guided to the surface of the drum 96 by means of the curved guide plates 100 and it descends thereon while being creased at two points by the ribs 97 and co-operating elements including the fingers 101, mounted on a rocking shaft 102, carrying lever 103, carrying cam roller 104 engaging cam 105 secured on the shaft 59. Pressure roll 106, provided with adjustable pressure means 107, co-operates in the application of the required pressure to effect the creases in each letter sheet.

As each letter sheet descends, it is guided by guides 100, 108 and 109 and a stop flange 109a, and enters between folding means in a partly folded condition (FIG. 1). At this point the inserts 1 and 2 have reached a point for insertion between the parts 5 and 6 of the partially-folded leter sheet, and are received therein as shown in FIG. 20. The inserts are moved between the parts of the partially folded letter sheet by means of fingers 110 connected to a slide 111, engaged by one arm of a bell-crank lever 112, pivoted at 113 and having its other arm pivoted at 114 to a rod 115 extending from suitable cam mechanism to be described. This arrangement causes the inserts 1 and 2, or such additional inserts as may be required, to reach the position with relation to the letter sheet that is shown in FIG. 20.

Figure 15:
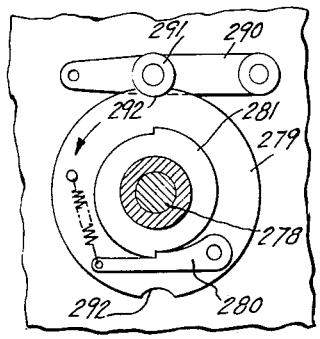
FIG. 15 is a view showing the clutch used in connection with the letter sheet folders, the view being taken on the line 15—15 of FIG. 14, looking in the direction of the arrows.

The folded letter sheet, with the inserts disposed between its folded portions, enters the final folding and pressing means shown in FIG. 11. Said pressing and final folding means includes a number of spring-pressed plates 275 and 276 resiliently mounted on a plate 277 fixed on a shaft 278. Said shaft 278 is provided with a clutch (FIG. 15) consisting of the notched disk 279 secured on the shaft 278, the spring-biased dog 280 secured on disk 279, the ratchet member 281, and the pivoted arm 290 having roller 291 for engagement with either of the two notches 292 in the disk 279. This clutch provides for a half revolution of shaft 279. Ratchet member 281 carries a gear 282 engaged by a rack 283, the lower end of the rack being connected at 284 to a crank arm 285 extending from shaft 286. Shaft 286 carries a bevel gear 287 meshing with a bevel gear 288 on the drive shaft 38.

Figure 16:
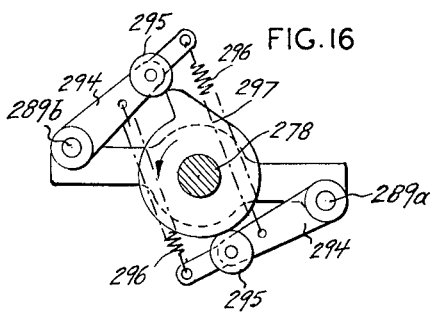
FIG. 16 is a sectional view, taken substantially on the line 16—16 of FIG. 14, looking in the direction of the arrows.
Figure 17:
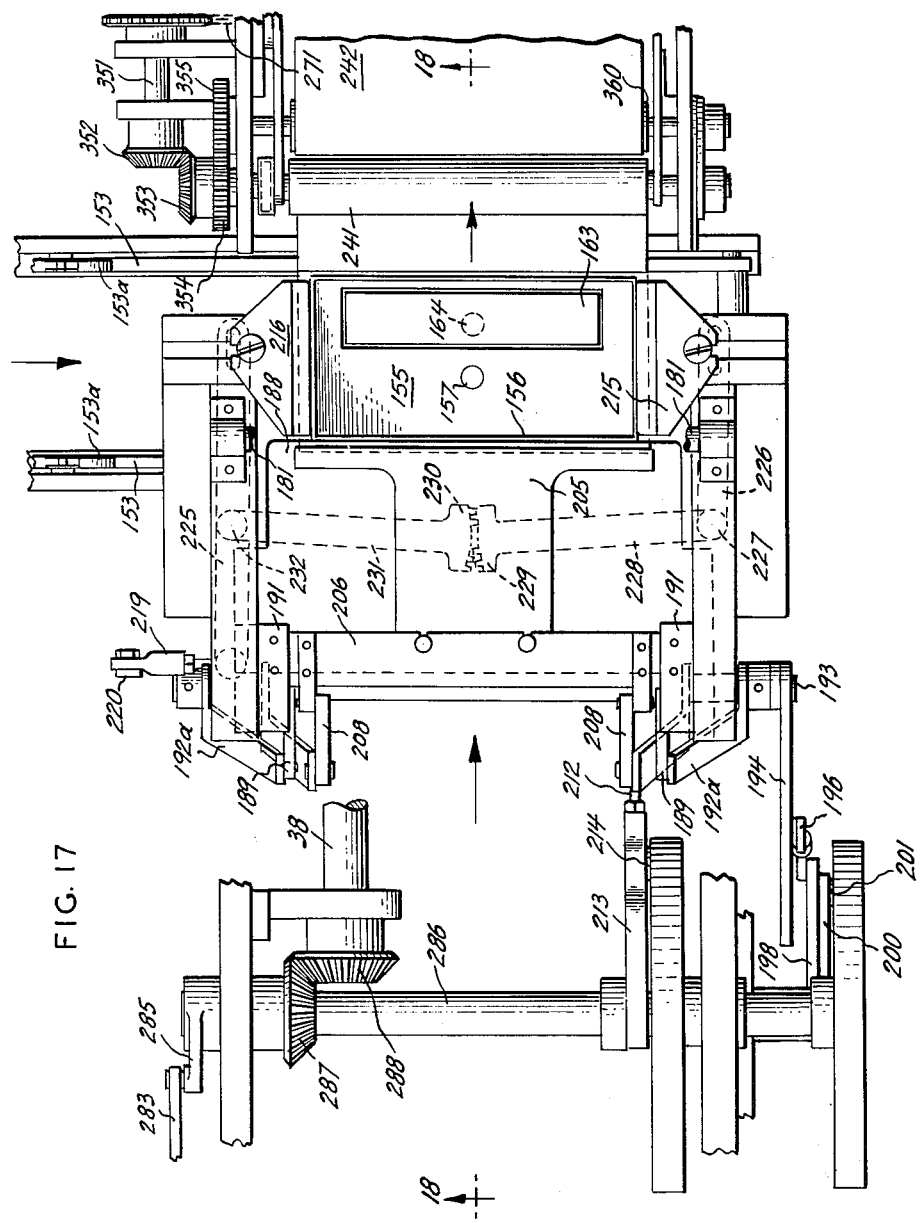
FIG. 17 is a plan view of the envelope folding mechanism and parts associated therewith.

Mounted on the shaft 278 are frames 289 in which shafts 289a and 289b are pivotally mounted, said shafts being capable of oscillating movement. Each of the shafts 289a and 289b carries a plurality of jaws 293 which clampingly engage the letter sheet and contents when delivered to the then uppermost of the plates 275 or 276. Each of the shafts 289a and 289b carries an arm 294 bearing a cam roller 295 held by the spring 296 (FIG. 16) against the edge of a cam 297. This arrangement is such that when the letter sheet reaches the uppermost one of the plates 275 or 276 and is delivered thereto by the fingers 110 on slide 299, the shaft 278 will be rotated one-half a revolution to bring the letter sheet and its contents to a lower level when fingers 298 engage the letter and contents to discharge it under the folding bar— to complete the final folding and position it under a spring pressure device shown at 301 which operates to flatten the letter sheet and contents, preparatory to the placement of the address card on top of the folded letter sheet, if such card is required. The jaws 293 are opened and closed by cam 297 at the proper times to grip and release the letter sheet and its contents.

The slide 299 is reciprocated by means of a link 303 having one end connected at 304 to the upper end of a lever 305 pivoted at 306 in a frame element 307. Lever 305 is pivotally connected at 308 to a yoke 309 carrying a cam roller 310 engaging in a cam groove in cam 312. The rod 115, which has one end connected to bell crank lever 112, has its opposite end attached at 313 to a bell crank 315, connected at 316 to slide 314. The bell crank 315 has its second arm connected to rod 317 attached to a yoke 318 embracing the shaft 286. Yoke 318 carries a cam roller 319 operative in the cam groove 320 of a cam mounted on shaft 286.

After having received the inserts 1 and 2 and having been completely folded and flattened to the condition diagrammatically shown in FIG. 21, the folded letter sheet and its contained inserts, are now moved to a position where they receive an address card, assuming that the envelope intended to receive the letter sheet and inserts is of the window type. The means for supplying the address cards 12 is shown at 11 in FIGS. 1 and 4 and since the same may be similar in construction to the insert-supply units at stations 3 and 4, a detailed description of the address-card supply means need not be given. It is sufficient to state that the cards 12, with their inscribed sides uppermost, are successively deposited on top of the folded letter sheets as shown in FIG. 22. Belt 51a conveys the address cards to the point of deposit on top of the folded letter sheets, and a chain, that shown at 36 and previously herein referred to, drives shaft 34b.

The envelopes employed for enclosing the folded letter sheets and their inserts or enclosures, are produced by being stamped out in flat blank formation by suitable mechanism not herein disclosed in detail, but contained within the housing shown at 152 in FIG. 2. The paper from which the envelope blanks are formed is supplied from a strip 150 in roll form, the strip drawn therefrom proceeding to the blanking mechanism contained in the housing 152. By means of such mechanism, the envelope blanks are cut from the strip, and if of the window type the windows are punched out and Glassine strips applied thereover and gum applied to the required flaps of the blanks. The envelopes 14, of the required size and shape, emerge as flat blanks fed face upwards from the envelope stamping means, and are conveyed by a travelling conveyor 153 to the envelope-folding mechanism.

The envelope producing mechanism just described is so located relatively to the previously-described parts of the apparatus that the envelopes proceeding from the stamping mechanism travel in a direction at right angles to the direction of travel of the folded letter sheet, as will be noted by the arrow at the top of FIG. 3. Each of the envelope blanks is carried by the conveyor 153 to a position below a folder 154 and above an elevator or lifting device 155, the function of the latter being to elevate the folded letter sheet and its contents, including the address card, as well as the envelope blank, and while doing so to cause partial folding of the flaps of the envelope blank. The operation of the envelope-folding means will be clear from FIGS. 25 to 29. In FIG. 25 it will be seen how the envelope blank 14, resting on the spaced conveyor 153 is brought to rest below the folder. Rollers shown at 153a aid in guiding the blanks into position.

The elevator 155 includes a surrounding rim or wall 156 which encloses the folded letter sheet 7 and its contents. The elevator is provided with a stem 157 by which it is raised and lowered at the proper times, by means of a cam 158 on shaft 38 engaging roller 159, the shaft 38 being driven by a chain engaging sprocket 161 and extending from a suitable power source. A linkage 162 is coupled to shaft 157 and the cam roller 159 is attached thereto, resulting in the required timed vertical reciprocating movements of the elevator.

Included in the elevating means is a supplemental elevating member or plunger 163, having a stem 164. A lever 165, pivoted at 166 in a fixed bracket 167 carries the cam roller 167a engaging with a cam groove 168 and a cam 169 on shaft 38. Said lever 165 has an end connected at 170 to one end of a link 171 pivoted at its opposite end as shown at 172 to the stem 164. This arrangement, which is similar to the mechanism employed for raising and lowering the body 155 of the elevator, serves to raise and lower the supplemental plunger 163 when required. The stems 157 and 164 are guided in their reciprocating movements by the bracket 190 through which they are vertically slidable.

Referring to FIG. 26, it will be therein seen that the elevator 155 has raised the folded letter sheets and the envelope blank to an extent to bring the envelope blank against the bed plate 173, or actually against the spring pressure-plate 174 carried thereby. The flaps on the blank are initially folded on the way up to the bed plate. The folding means 154 includes parts 175 and 176 which fold the end flaps of the envelope blank to a ninety degree position relative to the center panel of the blank. The parts 177 and 178 fold down the end flaps, the folding of all of the flaps occurring by the elevating of the blank.

Figure 18:
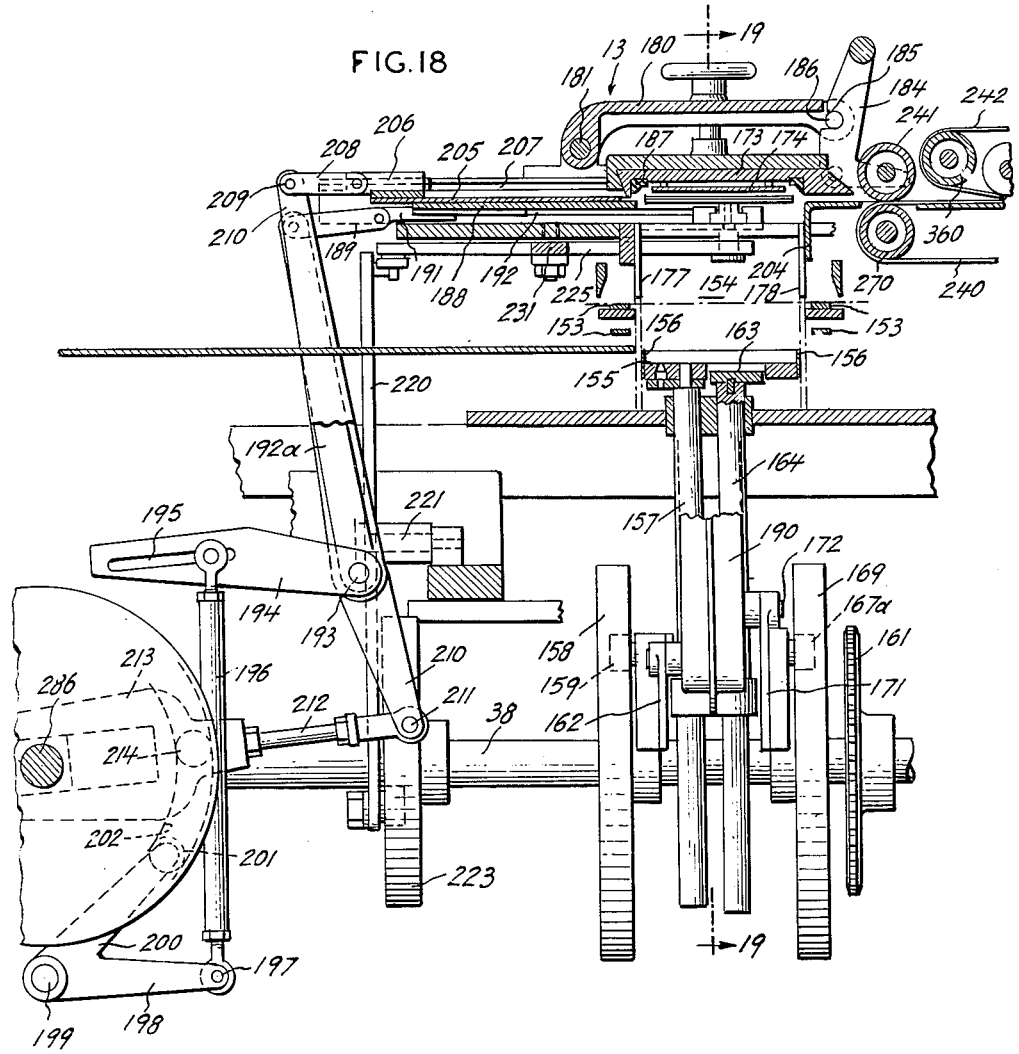
FIG. 18 is a sectional view, taken substantially on the line 18—18 of FIG. 17, looking in the direction of the arrows.
Figure 19:
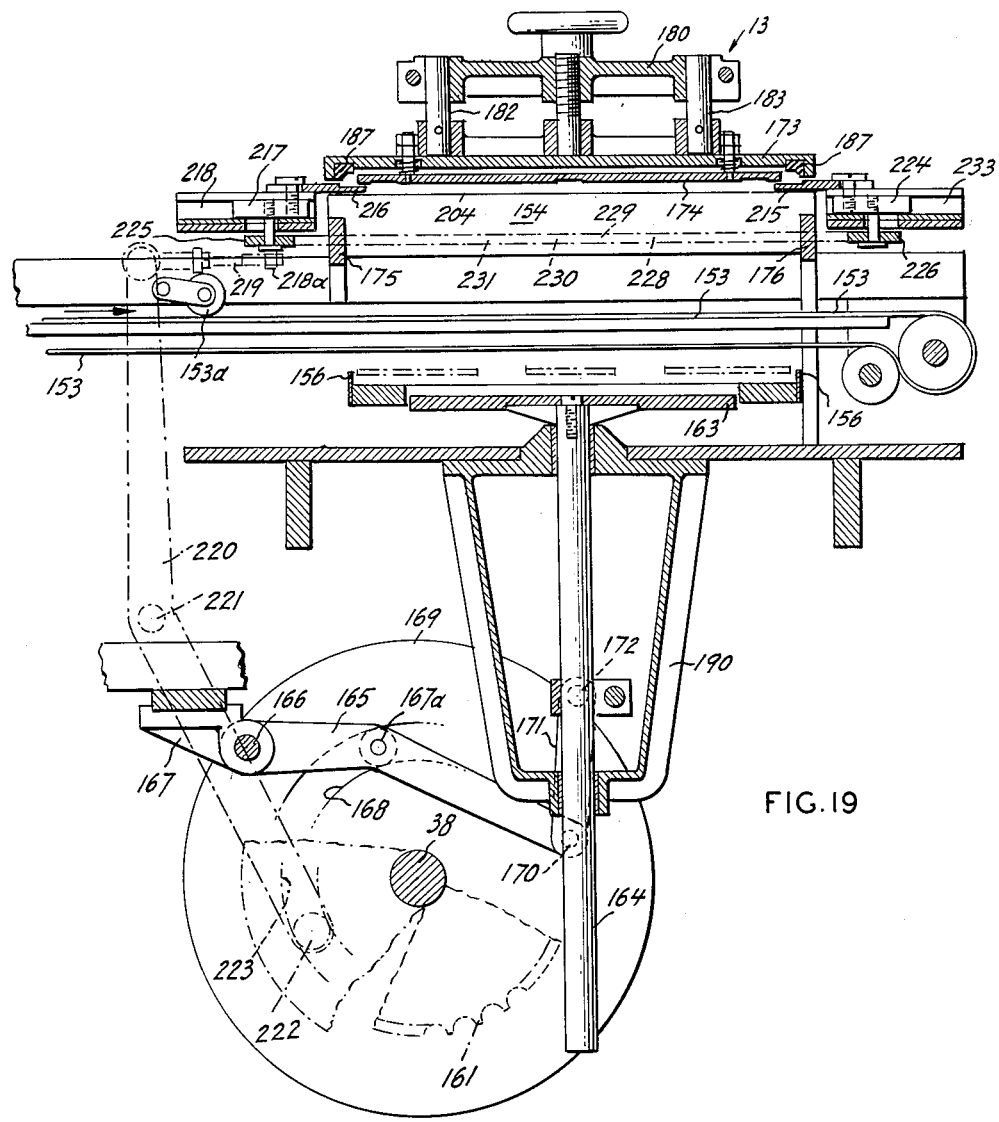
FIG. 19 is a sectional view, taken substantially on the line 19—19 of FIG. 18, looking in the direction of the arrows.

The bed plate 173 is supported by a frame 180, pivoted at one end on a rod 181 and attached to the bed plate by studs 182, 183. In its lowered or operative position, as shown in FIGS. 18 and 19, the frame is held down by a locking member 184 having a notch 185 into which a cross rod 186 on the end of the frame 180 fits. The frame 180 and the bed plate and pressure plate attached thereto can be swung upwardly when required for clearing or replacement of the parts. Creasing elements 187 are provided in the bed plate.

When the envelope and the letter sheet, inserts and address card are elevated as shown in FIG. 26, the next step consists in the infolding of the larger or side flaps. Gum is applied to the required flaps prior to the blank reaching the folding means, or during travel of the blank, so that when the flaps are folded down to overlapping relationship, they will adhere to one another.

The tuckers which perform the side flap folding include the slidable plate 188 which is reciprocated by cam means, including a link 189 attached at one end to a block 191 secured to a plate 188 slidable in a guide groove 192. The opposite end of the link 189 is pivotally attached to the upper end of a link 192a, pivoted at 193 to a slotted arm 194, the slot 195 thereof being adjustably engaged by the upper end of a rod 196 having its lower end pivotally attached at 197 to one of the arms of a bell-crank lever 198. The bell-crank lever 198 is pivoted at 199 and has its other arm 200 carrying a cam roller 201 engaging a cam slot 202 provided on a cam 203 on rotative shaft 286. The second tucker for the side flaps consists of member 204 which folds down the second side flap as the same is pushed against it.

An ejector plate 205 is attached to a slide 206 reciprocable in a guideway 207. Slide 206 is connected to one end of a link 208 having its other end attached at 209 to the upper end of lever 210 pivotally attached at 211 to one end of a rod 212 provided at its opposite end with a yoke 213 embracing shaft 286. The yoke carries a cam roller 214 engaging in the cam groove 202 on shaft 286.

The tuckers for the smaller or end flaps of the envelope are indicated at 215 and 216. That shown at 216 is secured to a sliding block 217 slidable in a guideway 218. Pin 218a attaches the block 217 to the end of a lever 225 connected to a link 219 having its opposite end connected to the upper end of a lever 220, pivoted for rocking movement at 221, and provided with a cam roller 222 operative in a cam groove in a cam 223, fixed on shaft 38.

The tucker 215 is attached to a sliding block 224, movable in a guide slot 233 and connected to one end of a lever 226 having its opposite end pivotally attached at 227 to an arm 228 provided at its end with a segmental gear 229 in mesh with a similar gear 230 provided on the end of an arm 231 pivotally connected at 232 to a substantially midway point on the lever 225. The above described arrangement is such that when the tucker 216 is moved in a direction toward one of the end flaps of the envelope the tucker 215 will also be moved toward the opposite end flap.

As will be noted in FIG. 27, when the folding of the first of the side flaps takes place, the elevator 155 will have been lowered while the supplemental plunger 163 will have been raised and it remains raised at this time to hold the letter sheet and its contents and the address card positioned against the under side of the envelope blank and is held against pressure plate 174.

When the tuckers 215 and 216 are moved toward one another, the same will fold down the end flaps while the supplemental plunger 163 is lowered. The envelope and its contents is then moved toward the right, as viewed in FIG. 18 by the sliding movement of the ejector plate 205 to push the envelope against and over member 204 and then cause it to be engaged between belt 240 and roller 241 and moved to point of egress of the apparatus. The drum 360 over which an upper feed belt 242 extends is driven from a shaft 38 (FIG. 4) by chain 271 extending to a sprocket on a short shaft 351, carrying bevel gear 352 meshing with bevel gear 353. Bevel gear 353 is on the shaft of drum 270 and said shaft also carries a gear 354 meshing with a gear 355 on the shaft of drum 360.

The operation of the described apparatus is briefly as follows:

If inserts or enclosures are to be included in the contents of the envelope, the inserts are successively removed from the bottom of one or more of the magazines 3 and 4 and are deposited on the carrier operative below them. If the envelope is to contain only a letter sheet, then the portion of the apparatus which delivers the inserts or enclosures can remain inoperative. If enclosures or inserts are to be used the same, after leaving their respective magazines, are transported to the letter sheet folding station where they are inserted between portions of the partly-folded letter sheet, the letter sheet is then completely folded around the inserts, and then the resultant packet, consisting of the folded letter sheets with the inserts between its overlying parts, is carried to the address-card delivery station. If pre-addressed envelopes are used rather than widow envelopes, the address-card delivery station may remain inoperative. If it is used, the mechanism thereat will deliver an addressed card or sheet to a position on top of the folded letter sheet to be transported thereby to the enveloping station.

The envelope blanks are delivered to the enveloping station and there the folded letter sheet and its contents, and the address card as well as the envelope blank are elevated and are moved through a folder to initially fold the flaps of the envelope. Tuckers then operate to fold down the several flaps of the envelope blank to complete the mailing piece and the filled and sealed envelope is then discharged from the apparatus.

It will be understood that various controls may be used in connection with this apparatus to thereby insure proper feeding; to signal any defective operation, such as feeding a double rather than a single sheet, or missing an enclosure etc. and such controls, as well as adjustment means for adapting the apparatus for various sizes of sheets, envelopes and inserts have been omitted to more clearly disclose the features to which the present invention relates.

Having thus described an embodiment of the invention, it is obvious that the same is not to be restricted thereto, but is broad enough to cover all structures coming within the scope of the annexed claims.

What we claim is:

1. In an apparatus for preparing mailing material, a plurality of magazines for holding inserts, means for successively removing inserts from the bottoms of the magazines and depositing the inserts so removed in superposed relation on a carrier, letter sheet supply and folding means to which the inserts are transported by the carrier, means for causing the inserts to be deposited between parts of one of the partly folded letter sheets, means for completing the folding of the letter sheet around the inserts, a magazine for holding address cards, means for successively removing cards therefrom and depositing each card so removed on top of the folded letter sheets, envelope supporting means on which an envelope blank is rested with its inside face disposed downwardly, means for moving the folded letter sheet and its contents and the address card to bring the same into contact with the downwardly-directed inside face of the envelope blank, a two-part support for bringing the folded letter sheet and its contents against the under side of the envelope blank and folding means for folding down the one of the flaps of the envelope blank around the letter sheet, inserts and address card while the same are supported by one of the parts of the support, and means for shifting said part to permit of the folding of a second flap.

2. In an apparatus for preparing mailing material, means for producing envelopes from a paper strip, envelope-folding means to which the envelope blanks so produced are delivered with their inside faces directed downwardly, said folding means including a bed plate on which each of the blanks is rested with its face directed downwardly, a pair of side-by-side elevators for raising a folded letter sheet to bring it against the inside face of one of the envelope blanks, means for causing a lowering of one of the elevators, a flap tucker operative to infold one of the flaps of the envelope blank while the blank and the letter sheet are supported by the other elevator, means carried by the tucker for laterally moving the blank and its contents while the second elevator is being lowered, and pressing rollers between which the blank and its contents are being moved, for causing a folding down of a second flap on the blank.

3. In an apparatus for preparing mailing material, a plurality of magazines for holding mail enclosures, means for successively removing enclosures from said magazines and piling them one upon another on a conveyor, a magazine for letter sheets, means for successively extracting letter sheets from the latter magazine and partly folding the same and positioning them in the path of travel of the inserts previously removed from the other magazines whereby said inserts will become positioned between folded parts of the letter sheets, means for completing folding of the letter sheets to cause the same to embrace the inserts placed within them, means for producing envelope blanks from a paper strip, envelope means to which the envelope blanks so produced are delivered, means for supporting each of the blanks with its inside face directed downwardly, means for bringing the folded letter sheets to a position below the downwardly-directed blank, means for elevating the letter sheets, envelope folding means and means for retracting the elevating means out of the path of said folding means.

4. In an apparatus for preparing mailing material as provided for in claim 3, including means for supplying an address card and depositing the same on top of the folded letter sheet whereby the ascent of the folded letter sheet and its inserts with the card on top will bring the address card against the downwardly-directed inside face of the envelope blank.

5. In an apparatus for preparing mailing material, means for depositing an insert on a conveyor, means for depositing a second insert on top of the first insert, a letter sheet supply, means for forming a pair of spaced creases across a letter ssheet fed from the letter sheet supply, folding means to which the letter sheet is guided to fold the letter sheet on one of the creases, means for inserting both of the inserts between parts of the partly folded letter sheet, means for folding the letter sheet on its second crease to thereby bring parts of the letter sheet in overlying relation to the inserts confined between folded parts of the letter sheet, means for depositing an address card on top of the overlying parts of the letter sheet, an envelope folding bed, an elevator, means for depositing the letter sheet and its contents on the elevator with the address card directed upwardly and toward the inner face of the envelope blank, means for raising the elevator to bring the letter sheet and its contents and the uppermost address card against the envelope blank, and means for folding the envelope blank about the letter sheet and its contents and the address card.

References Cited in the file of this patent

UNITED STATES PATENTS

| | | |
|---|---|---|
| 999,204 | Bunnig | Aug. 1, 1911 |
| 2,030,656 | Royster | Feb. 11, 1936 |
| 2,055,716 | Berkowitz | Sept. 29, 1936 |
| 2,077,658 | Ballatore | Apr. 20, 1937 |
| 2,208,345 | Rosebush | July 16, 1940 |
| 2,569,219 | Bamber et al. | Sept. 25, 1951 |
| 2,865,155 | Nydegger | Dec. 23, 1958 |
| 2,890,555 | Hayssen | June 16, 1959 |
| 2,915,863 | Kummer | Dec. 8, 1959 |